United States Patent [19]
Schneider et al.

[11] 3,962,400
[45] June 8, 1976

[54] INJECTION MOLDING OF POLYAMIDES PREPARED FROM TEREPHTHALIC ACID MONO- OR DI-METHYL ESTERS AND 2,2,4-AND/OR 2,4,4-TRIMETHYLHEXAMETHYLENEDIAMINE

[75] Inventors: Johannes Schneider; Wolfgang Pungs, both of Troisdorf, Germany

[73] Assignee: Dynamit Nobel Aktiengesellschaft, Troisdorf, Germany

[22] Filed: Sept. 10, 1973

[21] Appl. No.: 395,795

Related U.S. Application Data

[60] Division of Ser. No. 260,942, June 8, 1972, abandoned, which is a continuation-in-part of Ser. No. 771,208, Oct. 28, 1968, abandoned.

[30] Foreign Application Priority Data
Oct. 28, 1967 Germany............................ 1669988

[52] U.S. Cl.............................. 264/328; 260/78 R; 260/78 S; 264/331
[51] Int. Cl.²........................................... B28B 1/24
[58] Field of Search........... 260/78 R, 78 S; 264/95, 264/176, 328, 331

[56] References Cited
UNITED STATES PATENTS

| | | |
|---|---|---|
| 3,150,117 | 9/1964 | Gabler .............................. 260/78 R |
| 3,294,758 | 12/1966 | Gabler .............................. 260/78 R |
| 3,329,653 | 7/1967 | Beavers et al. .................... 260/78 X |
| 3,379,695 | 4/1968 | Wolfes et al...................... 260/78 R |
| 3,449,299 | 6/1969 | Schneider et al. ................ 260/78 R |
| 3,454,536 | 7/1969 | Shade et al. ....................... 260/78 R |

*Primary Examiner*—Lorenzo B. Hayes
*Attorney, Agent, or Firm*—Burgess, Dinklage & Sprung

[57] ABSTRACT

Injection molding process for polyamide composition and shaped articles produced therefrom wherein the polymer is the condensation product of a terephthalyl moiety and a 2,4,4- or 2,2,4-trimethylhexamethylenediamine-1,6 which polymer has a viscosity number of 120 to 180, preferably 125 to 140, as measured according to DIN 53,727.

5 Claims, No Drawings

INJECTION MOLDING OF POLYAMIDES PREPARED FROM TEREPHTHALIC ACID MONO- OR DI-METHYL ESTERS AND 2,2,4-AND/OR 2,4,4-TRIMETHYLHEXAMETHYLENEDIAMINE

This is a division of application Ser. No. 260,942, filed June 8, 1972, now abandoned which in turn is a continuation of application Ser. No. 771,208 filed Oct. 28, 1968 both now abandoned, which application carried forward disclosure from and was copending with Ser. No. 561,412 of June 29, 1966, now U.S. Pat. No. 3,449,299.

This invention relates to polyamide molding materials and to molded products produced therefrom.

Amorphous, transparent, high-impact-strength polyamides of high thermal stability of shape, prepared from terephthalic acid and 2,2,4-trimethylhexamethylenediamine and 2,4,4-trimethylhexamethylenediamine or from mixtures of the diamine components are described in U.S. Pat. No. 3,150,117. In order to manufacture molded articles having transparency, impact-strength and stability of shape, it is necessary to use granules of these polyamides having viscosity numbers ranging from 92 to 116, and to use working temperatures of 280° to 320°C and a mold temperature of 90° to 110°C. The measurement of the viscosity number was performed according to DIN 53,727 using m-cresol as the solvent. Under these conditions, however, the known polyamides have poor flow characteristics and therefore they can be fabricated only with difficulty. On account of these unfavorable flow characteristics of the fused material, the highest possible injection pressure and a high rate of injection must be used, which often results in strong yellow discoloration of the products. Injection-molded objects or extrusions made from these polyamides are inclined to develop tension cracks and voids. Another disadvantage is that they undesirably absorb much moisture.

It is known that the flow characteristics of polyamides and their tendency to form voids can be controlled in the fabricating process by varying the working temperature, the injection-pressure and the injection rate, and by adding lubricants or parting agents to them. A reduction of the moisture absorption can be achieved by the lengthening of the linear carbon chain of the monomer units and by the concomitant change in the amide group concentration.

It is furthermore in the prior art to improve the flow characteristics of polyamides by kneading them with radical-forming compounds or with ethylenically and acetylenically unsaturated compounds.

By varying the working conditions, either the flow characteristics and the void-forming tendency are not improved to a satisfactory extent, or the polyamides are harmed in regard to their mechanical properties and in some cases the molded products are overcharged to prevent the formation of voids and consequently are liable to develop tension cracks. The use of the radical forming agents is dangerous on account of their explosiveness. In any case, an additional kneading process results in a higher cost of the final product.

It has now been found that the above-mentioned disadvantages do not occur in fabricating processes performed on injection molding and extruding machines if there is used for the production of transparent, high-impact-strength objects of high stability of shape, molding compounds made from polyamides which have been prepared by known methods from terephthalic acid dimethyl ester and 2,2,4- and/or 2,4,4-trimethylhexamethylenediamine, which polyamides have a viscosity number ranging from 120 to 180 and preferably from 125 to 140.

The molding compounds are generally worked without other additives, although light stabilizers or heat stabilizers, for example, can be used. The addition of organic and inorganic fillers and colorants is possible, although such must be accomplished in quantities which do not impair the desired flow characteristics.

It is desirable to work such granular molding compounds in the temperature range between about 250° and 320°C. The viscosity numbers have been determined in accordance with DIN 53,727 in a solution of 0.5 % by weight in m-cresol at 25°C.

The preparation of the polyamides in question is described in German Pat. Application C 34, 342 IVd/39 c.

When these granular molding compounds in the above-mentioned range of viscosity numbers are used, the injection pressure and injection rate can be adapted without difficulty, within the above-stated range of working temperatures, to any conditions that may be encountered in the injection molding process. For the achievement of thick-walled, void-free extrusions and molded products it is preferable to use granular molding compounds having viscosity numbers ranging from 250° to 320°C from granules of polymer having viscosity numbers ranging from 120 to 180 are transparent and amorphous and have a high impact strength and rigidity of shape.

In spite of the higher viscosity (which was determined as a solution viscosity in a solution of 0.5% in m-cresol at 25°C, and as a fusion viscosity in an extrusion viscosimeter with nozzles of 3.0 to 6.7 mm diameter in a shear drop range from 5 to 300 sec$^{-1}$ at a temperature of 285°C), the flow characteristics are substantially improved thus resulting in conditions more favorable for working on injection molding and extruding machines. Test specimens made from the above-described polyamides show a lower moisture absorption and a higher notch impact toughness. Thick-walled products have a much lower tendency to form cracks and voids upon cooling. These results are surprising because, on the one hand, it was to be expected that on account of the substantially higher viscosity, the working temperature would have to be higher or a substantially higher injection pressure would have to be used, and, on the other hand, embrittlement and the formation of bubbles were to be expected due to thermal damage occurring by operating at such temperatures.

In the following Examples 1 and 2, a description is given of the process of the manufacture of the polyamides which are obtained if terephthalic acid is used, in the one case, and if the dimethyl ester of terephthalic acid is used, in the other. The operating conditions and the properties of injection molded products are listed in Tables 1 and 2.

Example 1 (State of the Art)

The manufacture of polyamides of terephthalic acid and 2,2,4- and/or 2,4,4-trimethylhexamethylenediamine to be made into molded products on injection molding machines and extruding machines is performed in a manner analogous to nylon 6.6. The salt prepared from terephthalic acid and the diamines is dissolved under nitrogen with distilled water to form 80% solution while being heated in the dissolving tank to temperatures of as high as 200° to 220°C, whereupon the original paste-like mass becomes a clear solution with the establishment of a certain pressure, and this clear solution is transferred by its pressure in the dissolving tank to a polymerization autoclave that has been previously heated to 160° to 180°C. The polymerization can be performed at temperatures of about 225°C. After the polymerization, the pressure is removed, and the fused polymer is forced from the autoclave under nitrogen pressure, through a die by which it is formed into a band which is cooled by water at room temperature. The band is freed of adhering water and then granulated. Only those granular products of this composition whose viscosity numbers range from 90 to 110 can be used for the manufacture of products in injection molding machines and extruding machines.

Objects were made from polyamides made from terephthalic acid and the following diamine mixture (molar ratio 1:1):

1,6-diamino-2,2,4-trimethylhexane plus
1,6-diamino-2,4,4-trimethylhexane on an EL VII piston-type injection molding machine.

The physical properties measured on these specimens are listed in the following Table 1.

TABLE 1

|  | DIN Std. No. | Unit |  |
|---|---|---|---|
| Viscosity number | 53727 |  | 100 |
| Injection temperature |  | °C | 280 |
| Injection pressure |  | Kg/cm² | approx. 1100 |
| Spiral length |  | cm | 19 |
| Bending stress limit | 53452 | Kg/cm² | 1250 |
| Impact toughness | 53453 | cmKg/cm² | No fracture |
| Notch impact toughness | 53453 | cmKg/cm² | 10 |
| Tensile strength (Yield point) | 53453 | Kg/cm² | 800 |
| Ball test hardness after 60 sec | 53456 | Kg/cm² | 1400 |
| Stability of shape |  | °C |  |
| According to Martens |  |  | 100 |
| According to Vicat (Air 5 Kg) |  |  | 145 |
| Shrinkage in relation to mold |  | % | 0.5 |
| Water Absorption (1 mm sheet) after 4 days at 20°C | 53472 | mg | 44 |

Example 2 (The Process of the Invention)

The manufacture of the polyamides, which are used according to the invention from the dimethyl ester of terephthalic acid and 2,2,4- and/or 2,4,4-trimethylhexamethylenediamine is performed, for example, according to German Patent Application No. C 34342 IVd/39 c, through the preliminary condensation product stage followed by condensation polymerization, the preliminary condensation being performed by heating the starting materials at 90° to 100°C at normal pressure with the addition of water. The methanol-water mixture is largely removed by distillation at normal pressure, and the concentrate can be polymerized either at elevated pressure at first, followed by normal pressure, or at normal pressure all the way through, at temperatures between 250° and 290°C. The preparation of the preliminary condensation products is performed by stirring a practically equimolar mixture of the terephthalic acid-dimethyl ester with the diamine in question in the presence of water at preferably 90° to 95°C, it being necessary to use at least 45 parts by weight of water per 100 parts by weight of terephthalic acid dimethyl ester, on account of the solubility of the preliminary condensation product in water. This can be done either with refluxing or with the simultaneous removal of the methanol yielded in the reaction by distillation. As soon as the quantity of methyl ester groups in the starting mixture — considered as 100% — has diminished to the desired value, which is preferably 10% or less, the water, which may still contain methanol, is removed by distillation. If this results in a solidification of the concentrate, the distillation is interrupted prior to the complete removal of the water and the mass is heated in a closed reaction vessel above the melting point of the preliminary condensation product, then gradually reduced to normal pressure and polymerized to the end. In many cases, however, the temperature can be continuously raised to the final value without interrupting the distillation. Due to side-reactions, N-methyl groups sometimes form. The resulting melted product is made into a granular molding compound as in Example 1. Compounds having viscosity numbers ranging from 120 to 180 can be worked in injection molding machines and extruders, although the viscosity range between 125 and 140 is preferred.

On an EL VII piston-type injection molding machine, objects were prepared from the dimethyl ester of terephthalic acid and the 1:1 diamine mixture of:

1,6-diamino-2,4,4-trimethylhexane and
1,6-diamino-2,2,4-trimethylhexane and the physical characteristics were determined.

TABLE 2

|  | DIN Std. No. | Unit |  |
|---|---|---|---|
| Viscosity number | 53727 |  | 130 |
| Injection temperature |  | °C | 270 |
| Injection pressure |  | Kg/cm² | 1000 |
| Spiral length |  | cm | 28 |
| Bending stress limit | 53452 | Kg/cm² | 1200 |
| Impact toughness | 53453 | cmKg/cm² | No fracture |
| Notch impact toughness | 53453 | cmKg/cm² | 15 |
| Tensile strength (Yield point) | 53455 | Kg/cm² | 850 |
| Ball test hardness after 60 sec | 53456 | Kg/cm² | 1400 |
| Stability of shape |  |  |  |
| According to Martens |  |  | 95 |
| According to Vicat (air 5 Kp) |  |  | 150 |
| Shrinkage in relation to mold |  | % | 0.5 |
| Water absorption (1 mm sheet) after 4 days at 20°C | 53472 | mg | 34 |

The rheological behavior of the polyamides made according to Examples 1 and 2 was determined at 285°C in an extrusion viscosimeter operating on the capillary principle. The measurements were performed with nozzles having a diameter between 3 and 6.7 mm, and covered a shear drop range from about 5 to 300 sec$^{-1}$. The graphs 1 and 2 represent the true flow curves (Graph 1) and the apparent viscosity (Graph 2) in relation to the apparent shear drop.

Curve a: Polyamide made from terephthalic acid and a 1:1 isomer mixture of 1,6-diamino-2,2,4-trimethylhexane and 1,6-diamino-2,4,4-trimethylhexane.
Solution viscosity: Viscosity number = 100
Injection molded spiral length at 280°C and an injection pressure of 1100 Kg/cm² = 19.

Curve b: Polyamide made from the dimethyl ester of terephthalic acid and a 1:1 isomer mixture of 1,6-diamino-2,2,4-trimethylhexane and 1,6-diamino,2,4,4-trimethylhexane.

Solution viscosity: Viscosity number = 100

Injection molded spiral length at 280°C and an injection pressure of 1000 Kg/cm$^2$ = 28.

When the pure isomers are used instead of the 1:1 mixture, analagous values are obtained for the polyamides on the acid basis and those on the ester basis.

What is claimed is:

1. In an injection molding process for the formation of a transparent, high-impact-strength object of high stability of shape wherein polymer is introduced into an injection molding apparatus maintained under conditions of temperature and pressure to form an injection molded article, the improvement which comprises utilizing as the polymer a polyamide which is the polycondensation product of a precondensate of dimethyl terephthalate and at least one diamine selected from the group consisting of 2,4,4-trimethylhexamethylenediamine and 2,2,4-trimethylhexamethylenediamine which polyamide polymer condensate has a viscosity number, according to Deutsche Industrie Norm 53,727 of 120 to 180, as measured in a 0.5% solution in m cresol of 25°C, said precondensate having a methyl ester content of 10% or less.

2. An improvement according to claim 1 wherein the polymer is injection molded at a temperature between 250° and 320°C.

3. An injection molding process according to claim 1 wherein the polymer has a viscosity number of 125 to 140.

4. An injection molding process according to claim 3 wherein the polymer has a viscosity number of 130.

5. An injection molding process according to claim 1 wherein the preccndensate has a methyl ester content of about 10%.

* * * * *

UNITED STATES PATENT AND TRADEMARK OFFICE
CERTIFICATE OF CORRECTION

PATENT NO. : 3,962,400
DATED : JUNE 8, 1976
INVENTOR(S) : JOHANNES SCHNEIDER and WOLFGANG PUNGS It is certified that error appears in the above-identified patent and that said Letters Patent are hereby corrected as shown below:

[60] "continuation-in-part" should read -- continuation --.

Signed and Sealed this

Twenty-fourth Day of August 1976

[SEAL]

Attest:

RUTH C. MASON
*Attesting Officer*

C. MARSHALL DANN
*Commissioner of Patents and Trademarks*